United States Patent [19]
Pardee

[11] Patent Number: 5,971,121
[45] Date of Patent: Oct. 26, 1999

[54] MAG STOP CLUTCH WITH CENTER POLE

[76] Inventor: James Alain Pardee, 3703 S. Murray Rd., Janesville, Wis. 53545

[21] Appl. No.: 09/070,068

[22] Filed: Apr. 30, 1998

[51] Int. Cl.$^6$ ........................................................ F16D 67/06
[52] U.S. Cl. .................. 192/18 B; 192/12 D; 192/84.31; 192/84.961
[58] Field of Search ................................. 192/12 R, 13 R, 192/14, 16, 18 B, 12 D, 84.31, 84.961

[56] References Cited

U.S. PATENT DOCUMENTS

| | | | |
|---|---|---|---|
| 2,618,368 | 11/1952 | Hoover | 192/18 B |
| 3,642,104 | 2/1972 | Schafer | 192/18 B |
| 3,741,353 | 6/1973 | McKinley et al. | 188/171 |
| 3,893,191 | 7/1975 | Gold et al. | 310/76 |
| 3,945,476 | 3/1976 | De Jong | 192/12 D |
| 4,300,082 | 11/1981 | Angersbach et al. | 318/614 |
| 4,566,574 | 1/1986 | Marshall | 192/84.91 |
| 5,119,918 | 6/1992 | Pardee | 192/18 B |
| 5,285,882 | 2/1994 | Pardee | 192/84 C |

*Primary Examiner*—Rodney H. Bonck
*Assistant Examiner*—Saúl J. Rodríguez

[57] ABSTRACT

An improved brake/clutch unit for use in a riding lawnmower or another vehicle is provided. The unit includes a rotor assembly disposed radially outwardly of a longitudinally extending input shaft, an armature assembly, and a field shell assembly. The rotor assembly includes a rotor disc disposed radially outwardly of the input shaft. The armature assembly includes an armature axially-spaced from the rotor disc and an output member connected to the armature. The field shell assembly includes a field shell that is fixed against rotation, a pair of permanent magnets, first and second pole pieces having relatively low magnetic reluctance, a third pole piece having a relatively high magnetic reluctance, and a field coil. The field shell includes a radially outwardly extending flange on which all of the pole pieces are disposed. The magnets are disposed between the flange and the first and second pole pieces while the third pole piece is disposed between the first and second pole pieces. The field shell, magnets, first and second pole pieces and armature form a magnetic circuit that draws the armature in a first axial direction into a braked position in engagement with the first and second pole pieces. Upon energizing the field coil, a second magnetic circuit is formed between the field shell, rotor disc, and armature. The second magnetic circuit draws the armature in a second axial direction towards the rotor disc and into a clutch engaged position. In particular, a portion of the armature angularly opposite the magnets engages the rotor disc first and forces the armature to disengage from one of the first and second pole pieces.

20 Claims, 2 Drawing Sheets

MAG STOP CLUTCH WITH CENTER POLE

BACKGROUND OF THE INVENTION

1. Field of the Invention

This invention relates to a clutch/brake unit for use in a riding lawnmower or similar vehicle, and more particularly, to a unit having a pole piece having a relatively high magnetic reluctance separating a pair of pole pieces having relatively low magnetic reluctance to enable more efficient release of the brake and engagement of the clutch.

2. Disclosure of Related Art

Clutch/brake units are commonly adapted for use in riding lawnmowers, garden tractors or similar vehicles to selectively transmit a drive torque from a motor to an implement drive (e.g., a mower blade drive) and to apply a positive braking torque to the drive when drive torque is not being transmitted.

A conventional clutch/brake unit may include an input member, or hub, connected to a longitudinally extending input shaft for rotation therewith, a rotor disc mounted on the input member, an armature axially spaced from the rotor disc, and an output member such as a pulley connected to the armature. The armature and output member may be connected by a plurality of springs that bias the armature in a first axial direction away from the rotor disc and into a braked position against a braking member. The unit may further include an electromagnetic clutch disposed on a side of the rotor disc opposite the armature. The clutch may include an electrical coil disposed within a stationary field shell. Energization of the coil establishes a magnetic circuit between the field shell, rotor disc, and armature and draws the armature in a second axial direction towards the rotor disc and into a clutch engaged position— concurrently releasing the armature from engagement with the braking member(s). Deenergization of the coil severs the magnetic circuit and the springs once again draw the armature in the first axial direction into a braked position against the braking member.

As noted by applicant in applicant's prior U.S. Pat. No. 5,119,918 (hereinafter, "'918 patent")—the entire disclosure of which is incorporated herein by reference—the above-described clutch/brake units have significant drawbacks. In these conventional units, the entire braking force is provided by the springs that connect the armature and the output member. As a result, these springs must be relatively strong. A relatively high electromagnetic force must then be generated by the electromagnetic clutch in order to release the brake and cause engagement of the clutch. In addition, the force provided by the springs increases as the armature is drawn away from the braked position and towards the clutch-engaged position against the rotor disc. Because a high electromagnetic force is required, larger and/or more expensive electrical components must be used both within the clutch/brake unit itself and within any vehicle or machine that incorporates the unit.

In the '918 patent, applicant disclosed a clutch/brake unit that is capable of overcoming the above-mentioned deficiencies. In particular, applicant disclosed a clutch/brake unit that incorporates a plurality of permanent magnets to effectuate braking. The plurality of magnets are disposed between a radially extending flange of the field shell and a corresponding plurality of pole pieces having relatively low magnetic reluctance. The magnets create a magnetic circuit between the magnets, the pole pieces, the field shell, and the armature that draws the armature in a first axial direction into a braked position against the pole pieces. Because the armature is drawn into a braked position by magnetic attraction, the springs that connect the armature and the output member need only be strong enough to transmit torque from the armature to the output member. Moreover, the braking force provided by the magnetic circuit decreases as the armature is drawn in a second axial direction towards the rotor disc and into the clutch-engaged position (as opposed to the increasing force in the conventional spring-set brake). Because less force is required to release the brake and bring the armature into engagement with the rotor disc, smaller and/or less expensive electrical components can be used in the clutch/brake unit and in the vehicle or machine incorporating the unit.

Although the clutch/brake unit described in the '918 patent represents a significant improvement over the prior art, additional improvements are desirable. One desired improvement would be to further reduce the electromagnetic force required to release the brake and engage the clutch. In the clutch/brake unit disclosed in the '918 patent, the magnets and pole pieces span an angular distance of less than one half the circumference of the field shell. Therefore, when the coil is energized, a portion of the armature furthest from the magnets quickly snaps into engagement with the rotor disc. As the magnetic attraction between the armature and rotor disc increases, the portion of the armature adjacent the magnets also snaps into engagement with the rotor disc. The force required to bring this latter portion of the armature into engagement with the rotor disc, however, is still greater than desired.

Another desirable improvement would be to enable the application of a protective coating, such as chrome carbide, to one or more of the pole pieces in order to increase the durability and lifespan of the pole pieces. Chrome carbide has a high magnetic reluctance. In conventional, clutch/brake units, therefore, only a relatively small amount can be applied to the pole pieces without a significant reduction in the magnetic attraction between the armature and the pole pieces, and consequently, the braking torque.

There is thus a need for a brake that will minimize or eliminate one or more of the above-mentioned deficiencies.

SUMMARY OF THE INVENTION

The present invention provides a clutch/brake unit that requires less electromagnetic force as compared to conventional units to release the brake and engage the clutch.

An object of the present invention is to provide a clutch/brake unit in which release of the brake and engagement of the clutch is accomplished more efficiently than in conventional units.

Another object of the present invention is to provide a clutch/brake unit in which a protective coating may be applied to components of the unit to increase the durability and lifespan of the unit.

A clutch/brake unit in accordance with the present invention includes a rotor disc connected to a shaft for rotation therewith. The shaft extends along a first axis and the rotor disc extends radially outwardly from the shaft. The unit also includes an armature axially-spaced from the rotor disc, an output member connected to the armature, and a field shell axially-spaced from the armature by the rotor disc. The field shell includes a radially outwardly extending flange. The unit further includes first and second pole pieces angularly spaced from one another and connected to the flange. The first and second pole pieces have a relatively low magnetic reluctance. The unit also includes first and second permanent magnets disposed between the flange and the first and second pole pieces, respectively. The field shell, the first and second permanent magnets, the first and second pole pieces, and the armature form a first magnetic circuit that draws the armature in a first axial direction away from the rotor disc and draws a first portion of the armature into engagement with the first and second pole pieces. In this manner the armature assumes a braked position. The unit further includes a third pole piece connected to the flange and disposed between the first and second pole pieces. The third pole piece has a relatively high magnetic reluctance. Finally the unit includes means, such as a field coil, for selectively generating a second magnetic circuit between the field shell, the rotor, and the armature. The second magnetic circuit draws the armature in a second axial direction towards the rotor disc wherein a second portion of the armature angularly opposite the first portion engages the rotor disc first thereby forcing the first portion to disengage from one of the first and second pole pieces.

In the clutch/brake unit disclosed in the '918 patent, the armature remained in engagement with both the first and second pole pieces even after the portion of the armature angularly opposite the pole pieces was drawn into engagement with the rotor disc. The addition of a third pole piece between the first and second pole pieces, however, ensures that the armature remains in engagement with only one of the first and second pole pieces once the portion of the armature angularly opposite the pole pieces engages the rotor disc. The resulting air gap between the armature and the unengaged pole piece weakens or severs the magnetic circuit that generates the braking torque. As a result, less electromagnetic force is required to bring the armature into complete engagement with the rotor disc.

A clutch/brake unit in accordance with the present invention has increased durability and a longer lifespan because less electromagnetic force is needed to overcome the braking torque within the unit. The durability and lifespan are also increased because a protective chrome carbide coating may be applied to the third pole piece. The clutch/brake unit disclosed in the '918 patent used only two pole pieces--both of which formed part of the magnetic braking circuit. Because chrome carbide has a high magnetic reluctance, applying it to those pole pieces would have significantly affected the braking torque of the unit. In a clutch/brake unit in accordance with the present invention, however, the coating may be applied to the third pole piece, which does not form part of the magnetic braking circuit. Application of the chrome carbide coating to the third pole piece will reduce the wear on all of the pole pieces and, consequently, extend the life of the unit.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
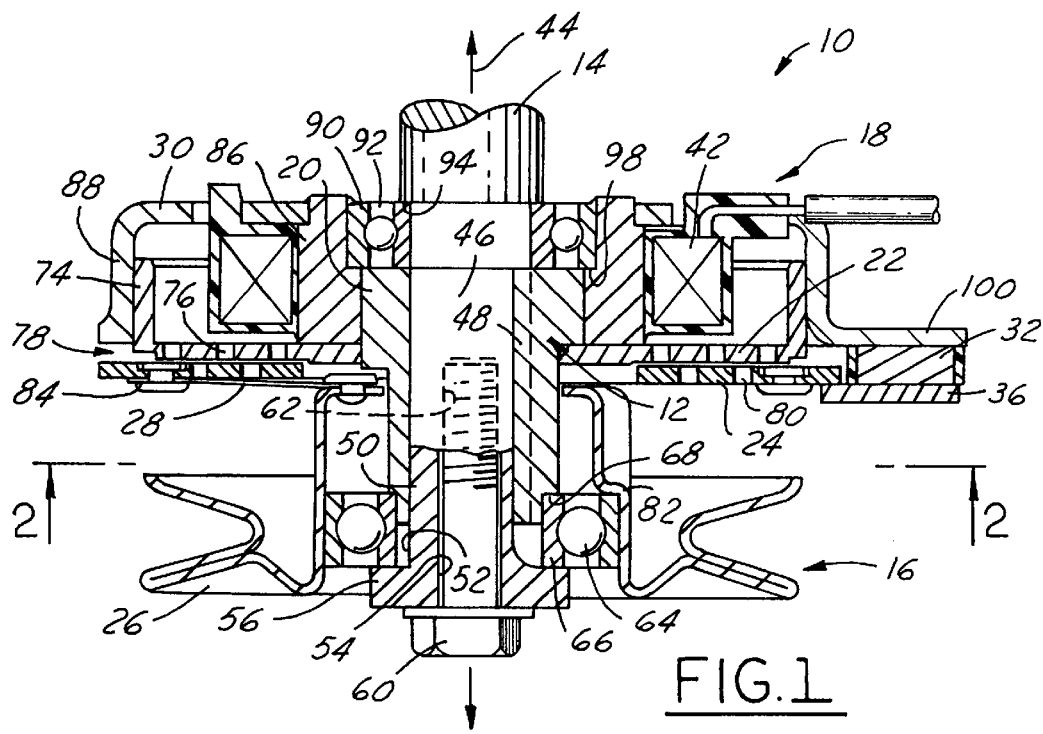
FIG. 1 is a cross-sectional view of a clutch/brake unit in accordance with the present invention illustrating the unit in a braked position.
Figure 2:
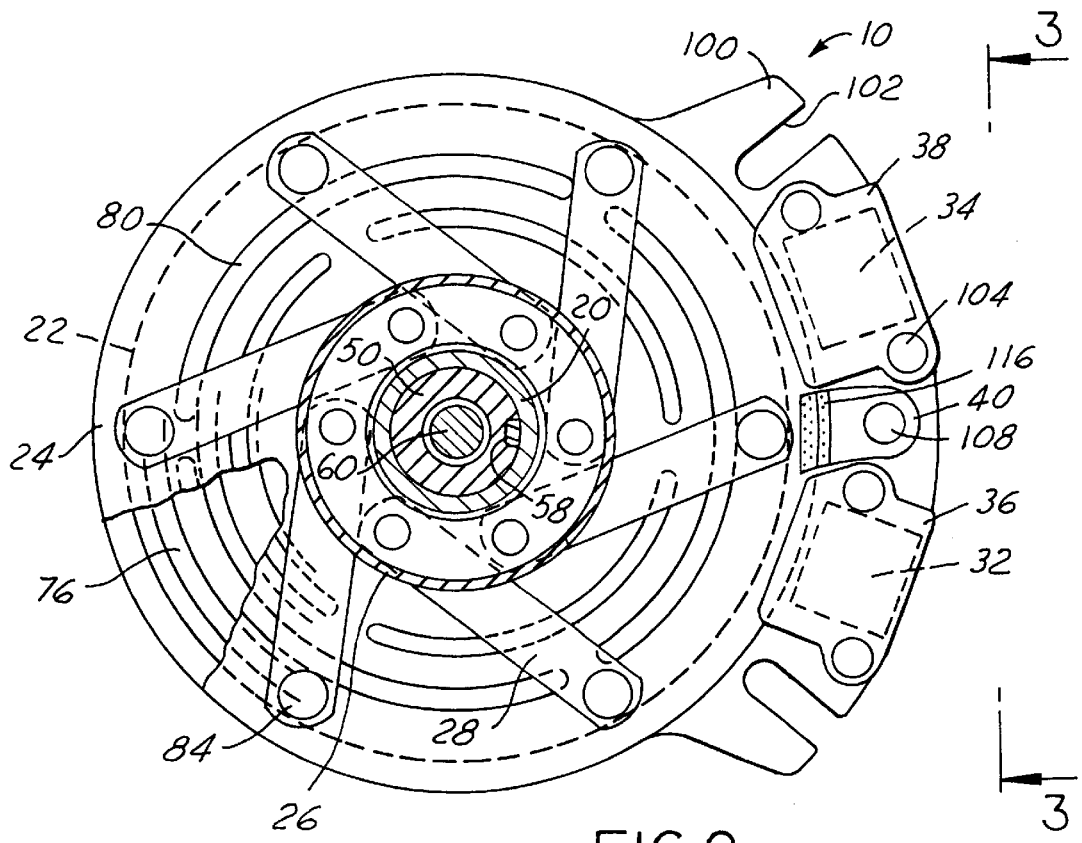
FIG. 2 is a cross-sectional view of the clutch/brake unit of FIG. 1 taken substantially along lines 2—2 of FIG. 1.

Referring now to the drawings wherein like reference numerals are used to identify identical components in the various views, FIGS. 1 and 2 illustrate a clutch/brake unit 10 in accordance with the present invention. Unit 10 is provided for use in a riding lawnmower, garden tractor, or similar vehicle to selectively transmit torque from an input shaft to an implement drive (e.g., a mower blade drive). Unit 10 is also provided to apply a positive braking torque to the implement drive when torque is not being transmitted to the drive. It should be understood that unit 10 may be utilized in a wide variety of vehicles and applications not specifically set forth herein.

Unit 10 includes a rotor assembly 12 disposed about a longitudinally extending shaft 14, an armature assembly 16, and a field shell assembly 18. Rotor assembly 12 may include an input hub 20 and a rotor disc 22. Armature assembly 16 may include an armature 24, an output member 26 such as a pulley, and means, such as leaf springs 28, for connecting member 26 to armature 24. Field shell assembly 18 may include a field shell 30, a pair of permanent magnets 32, 34, a corresponding pair of pole pieces 36, 38 having relatively low magnetic reluctance, a pole piece 40 having a relatively high magnetic reluctance, and means, such as a field coil 42, for generating a magnetic circuit between field shell 30, rotor disc 22, and armature 24 in order to cause selective engagement of armature 24 with rotor disc 22.

Input hub 20 is used in a conventional manner to provide a structural framework and structural support for the other components of unit 10. Hub 20 may be made from a powdered metal. Hub 20 is disposed radially outwardly of shaft 14 which extends longitudinally along an axis 44 and includes a reduced diameter portion 46. Hub 20 includes an axially extending key 48 and may be coupled to shaft 14 by inserting key 48 in an axially extending keyway (not shown) formed along the periphery of portion 46 of shaft 14. Unit 10 may also include a spacer 50 axially-spaced from portion 46 of shaft 14 and telescoped within hub 20. Spacer 50 may be used to support armature assembly 16 in assembled relation with the other components of unit 10 and may be made from conventional materials including powdered metals. Spacer 50 has a generally cylindrical outer surface 52, a cylindrical through-bore 54 and a flange 56 at one longitudinal end. Surface 52 may include one or more axially-extending keyways 58 to receive key 48 of hub 20. Bore 54 is configured to receive a screw 60 or other fastening means that may be threaded through bore 54 and into an opening 62 in portion 46 of shaft 14 in order to hold spacer 50, hub 20, and a bearing 64, in assembled relation with shaft 14. An inner race 66 of bearing 64 is secured between a shoulder 68 of hub 20 and flange 56 of spacer 50.

Rotor disc 22 is provided for selective engagement with armature 24 to transmit torque from shaft 14 to output member 26. Rotor disc 22 may be made from conventional metals or metal alloys, including steel. Rotor disc 22 is connected to shaft 14 by input hub 20 and extends radially outwardly from shaft 14. As set forth in applicant's prior U.S. Pat. No. 5,285,882 (hereinafter "'882 patent")—the entire disclosure of which is incorporated herein by reference—disc 22 may include a plurality of notches (not shown). A corresponding plurality of angularly spaced, radially outwardly extending lugs (not shown) on hub 20 may be inserted in the notches and expanded so as to create a tight engagement of disc 22 and hub 20. Disc 22 includes an axially extending annular member 74 disposed about the radial periphery of disc 22. Disc 22 also includes a plurality of radially spaced rows of angularly spaced slots 76, the purpose of which is set forth in greater detail hereinbelow. In the illustrated embodiment, disc 22 includes three rows of slots 76. It should be understood, however, that the number of rows, the number of slots 76 in any one row, and the size and shape of the slots 76 may vary.

Armature 24 is provided to transmit a braking torque to output member 26 and to selectively transmit a drive torque from shaft 14 to member 26. Armature 24 may be made from a variety of conventional metals and metal alloys including steel. Armature 24 is disposed radially outwardly of shaft 14 and is axially spaced from rotor disc 22 by an air gap 78. Like disc 22, armature 24 includes a plurality of radially spaced rows of angularly spaced slots 80, the purpose of which is described in greater detail hereinbelow. In the illustrated embodiment, armature 24 includes two rows of slots 80. The radially inner row of slots 80 on armature 24 is disposed between the radially inner and radially center rows of slots 76 on rotor disc 22. The radially outer row of slots 80 on armature 24 is disposed between the radially center and radially outer rows of slots 76 on disc 22. Once again, it should be understood that the number of rows of slots 80 on armature 24, the number of slots 80 in any one row, and the size and shape of slots 80 may vary.

Output member 26 is provided to transmit torque to an implement such as a mower blade (not shown). Output member 26 may comprise a pulley and may include a belt (not shown) that is connected to the mower blade or another driven device in a conventional manner. Output member 26 may be made from a variety of conventional metals and metal alloys, including steel. Member 26 is supported for rotation relative to hub 20 by bearing 64. Member 26 may include one or more shoulders 82 that help restrict the axial movement of bearing 64.

Leaf springs 28 are provided to transmit torque from armature 24 to output member 26. Springs 28 are also provided to allow axial movement of armature 24 relative to member 26 and towards and away from rotor disc 22. Springs 28 may be made from stainless steel. Springs 28 are connected at one end to armature 24 and at a second end to member 26 using rivets 84 or another fastening means.

Field shell 30 is provided to house field coil 42. Shell 30 also forms part of a magnetic circuit that causes the selective engagement of disc 22 and armature 24 as described in greater detail hereinbelow. Field shell 30 may be made from conventional metals and metal alloys, including steel. Shell 30 is generally U-shaped in cross-section and includes radially inner and radially outer annular members 86, 88. Inner member 86 is disposed adjacent to, and radially outwardly of, input hub 20. Inner member 86 also rests on an outer race 90 of a bearing 92 that is used to support shell 30 while enabling shaft 14 and hub 20 to rotate within inner member 86 of shell 30. Bearing 92 is restrained from axial movement by a shoulder 94 of shaft 14 on one axial end of bearing 92 and by hub 20 and a shoulder 98 of inner member 86 on another axial end of bearing 92. Outer member 88 of shell 30 is disposed radially outwardly of member 74 of disc 22. Shell 30 also includes a flange 100 that is integral with and extends radially outwardly from outer member 88. Fasteners (not shown) extend through notches 102 of flange 100 and secure shell 30 to the engine block or another fixed structure to prevent rotation of shell 30.

Pole pieces 36, 38 provide a breaking surface for armature 24. Pole pieces 36, 38 may be made from materials having a relatively low magnetic reluctance including conventional metals and metal alloys such as steel. Pole pieces 36, 38 may be connected to flange 100 of shell 30 by rivets 104 or another fastening means. A radially inner portion of each of pole pieces 36, 38 overlaps a radially outer portion of armature 24.

Figure 3:
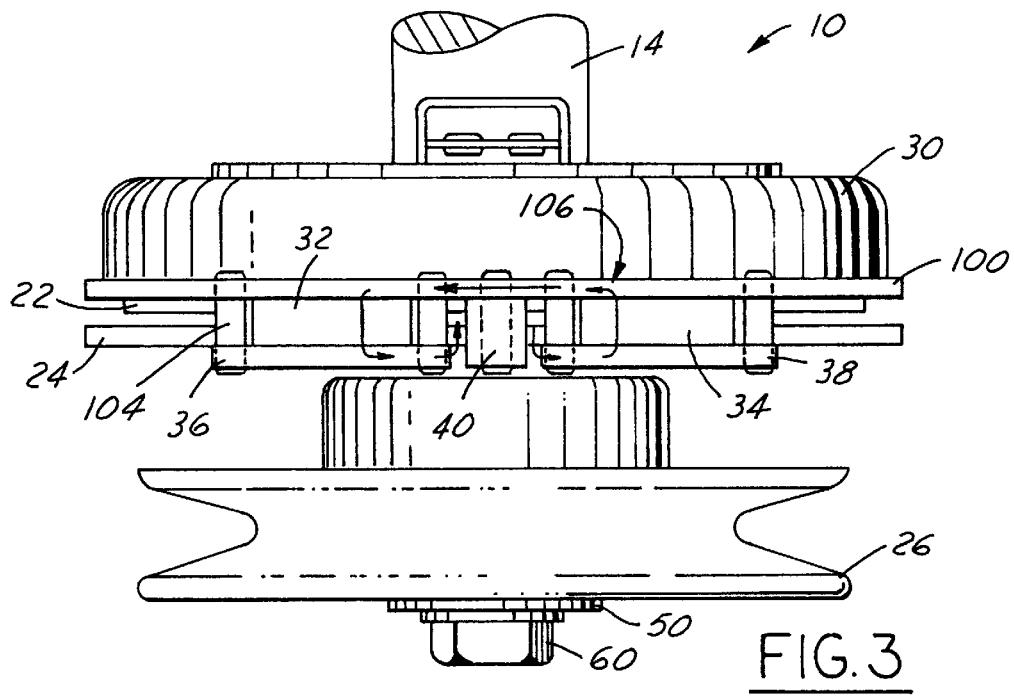
FIG. 3 is a plan view of the clutch/brake unit of FIGS. 1 and 2 taken substantially along lines 3—3 of FIG. 2.

Referring now to FIG. 3, permanent magnets 32, 34 are provided to form a magnetic circuit 106 between field shell 30, magnets 32, 34, pole pieces 36, 38, and armature 24. Magnets 32, 34 may be comprised of a ceramic material. Magnets 32, 34 are disposed between pole pieces 36, 38, respectively, and flange 100 and secured therebetween by rivets 104. A thin layer of plastic may be disposed on the radially inner and outer surfaces of magnets 32, 34. In the illustrated embodiment there are two magnets 32, 34 and two corresponding pole pieces 36, 38. The number of magnets (and corresponding pole pieces) may vary. However, as will become apparent from the discussion hereinbelow, the magnets (and the pole pieces) should be arranged such that the angular distance spanned by the magnets (and the pole pieces) is less than one-half the circumference of field shell 30. Magnets 32, 34 are magnetized such that magnets 32, 34 have axially facing poles of opposite polarity. In the illustrated embodiment the north pole of magnet 34 is axially nearer to flange 100 of shell 30 while the south pole of magnet 32 is axially nearer to flange 100. It should be understood, however, that the polarity of magnets 32, 34 may vary so long as like poles of adjacent magnets face in axially opposite directions. Within magnetic circuit 106, magnetic flux flows along the following path: magnet 32→pole piece 36→armature 24→pole piece 38→magnet 34→flange 100 of field shell 30→magnet 32. As shown in FIG. 1, whenever coil 42 is deenergized, circuit 106 draws armature 24 in a first axial direction away from rotor disc 22 and into a braked position in engagement with pole pieces 36, 38.

Referring now to FIG. 2, pole piece 40 is provided to enable easier release of armature 24 from pole pieces 36, 38 as described in greater detail hereinbelow. Pole piece 40 is disposed between pole pieces 36, 38 and may be made from materials having a relatively high magnetic reluctance such as powdered metal stainless steel. Pole piece 40 may be axially further from armature 24 than pole pieces 36, 38. Pole piece 40 is connected to flange 100 of field shell 30 by rivets 108, screws, or another fastening means. A radially outer portion of pole piece 40 may have a greater axial length than the radially inner portion of pole piece 40 overlapped by armature 24.

Figure 4:
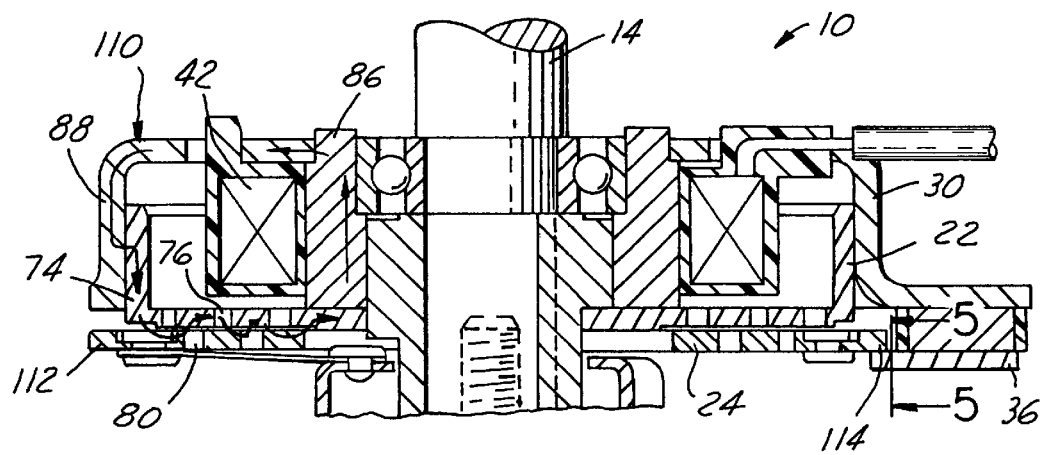
FIG. 4 is a partial cross-sectional view of a clutch/brake unit in accordance with the present invention illustrating the unit in a partially clutch-engaged position.

Referring now to FIG. 4, field coil 42 is conventional in the art and is provided to generate a magnetic circuit 110 between field shell 30, rotor disc 22, and armature 24 to cause engagement of rotor disc 22 and armature 24 and to thereby transmit torque from input shaft 14 to output member 26. Field coil 42 is generally annular and may be encapsulated within plastic. Coil 42 is disposed between inner and outer members 86, 88 of field shell 30 and may be connected electrically to a power supply (not shown) such as a vehicle battery. When coil 42 is energized, circuit 110 is formed between field shell 30, rotor disc 22, and armature 24. Magnetic flux flows from outer member 88 of shell 30 across an air gap to member 74 of rotor disc 22. The rows of slots 76 on disc 22 and the rows of slots 80 on armature 24 then cause the flux to travel back and forth between disc 22 and armature 24 across air gap 78 as shown. This arrangement enables a high torque engagement between disc 22 and armature 24 even when the axial distance of gap 78 is quite large. Finally, the flux returns from disc 22 to inner member 86 of shell 30.

Figure 5:
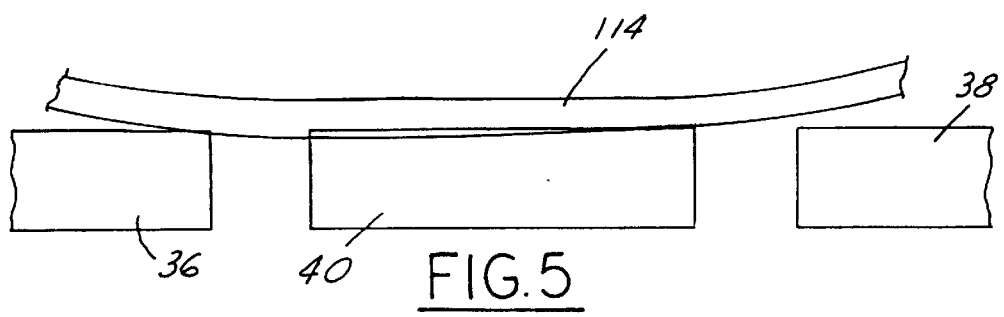
FIG. 5 is an enlarged side plan view of one portion of the clutch/brake unit of FIG. 4 taken substantially along lines 5—5 of FIG. 4.

Circuit 110 draws armature 24 in a second axial direction towards disc 22 and into a clutch engaged position. In particular, a portion 112 of armature 24 angularly opposite magnets 32, 34 snaps into engagement with disc 22 first. As mentioned hereinabove, magnets 32, 34 (and corresponding pole pieces 36, 38) preferably span an angular distance of less than one-half the circumference of field shell 30. As a result, the magnetic flux within circuit 106 travels through only a portion of field shell 30 and interference between circuit 110 and circuit 106 is minimized. Moreover, the arrangement of magnets 32, 34 and pole pieces 36, 38 enables portion 112 of armature 24 to quickly snap into engagement with disc 22. Referring now to FIG. 5, as portion 112 of armature 24 engages disc 22, a portion 114 of armature 24 disengages from one of pole pieces 36, 38. In the illustrated embodiment, armature 24 has disengaged from pole piece 38. In the clutch/brake unit disclosed in the '918 patent, armature 24 remained engaged with both pole pieces 36, 38 until enough magnetic force was generated within circuit 110 to disengage armature 24. Although portion 114 of armature 24 quickly snapped into engagement with disc 22, it is desirable to further reduce the magnetic force required to bring armature 24 into complete engagement with disc 22. With the addition of pole piece 40 between pole pieces 36, 38, once portion 112 of armature 24 engages disc 22, armature 24 is able to remain in contact with only one of pole pieces 36, 38 (in addition to pole piece 40). The resulting air gap between armature 24 and the unengaged pole piece 38 weakens or even severs circuit 106. As a result less electromagnetic force is required to disengage armature 24 from pole piece 36 and bring armature 24 into complete engagement with disc 22. Unit 10 can, therefore, be operated more efficiently.

The addition of pole piece 40 provides an additional advantage. To increase the durability and lifespan of pole pieces 36, 38, 40, it is desirable to place a protective coating, such as chrome carbide, on at least a portion of one or more of pole pieces 36, 38, 40. Chrome carbide has a high magnetic reluctance, however. Therefore, application of the coating to pole pieces 36, 38 causes a significant reduction in the magnetic attraction between armature 24 and pole pieces 36, 38, and consequently, the braking torque. In the present invention, however, a chrome carbide coating 116 may be applied to pole piece 40 (best shown in FIG. 2) because it is not a part of magnetic circuit 106. Application of coating 116 to pole piece 40 helps to reduce the wear on pole pieces 36, 38, 40, thereby increasing the durability and extending the lifespan of unit 10.

While the invention has been particularly shown and described with reference to the preferred embodiments thereof, it is well understood by those skilled in the art that various changes and modifications can be made in the invention without departing from the spirit and scope of the invention.

I claim:

1. A clutch/brake unit, comprising:
   a rotor disc connected to a shaft for rotation therewith, said shaft extending along a first axis and said rotor disc extending radially outwardly from said shaft;
   an armature axially-spaced from said rotor disc;
   an output member connected to said armature;
   a field shell axially-spaced from said armature by said rotor disc, said field shell including a radially outwardly extending flange;
   first and second pole pieces angularly spaced from one another and connected to said flange, said first and second pole pieces having a relatively low magnetic reluctance;
   first and second permanent magnets disposed between said flange and said first and second pole pieces, respectively, said field shell, said first and second permanent magnets, said first and second pole pieces, and said armature forming a first magnetic circuit drawing said armature in a first axial direction away from said rotor disc and a first portion of said armature into engagement with said first and second pole pieces;
   a third pole piece connected to said flange and disposed between said first and second pole pieces, said third pole piece having a relatively high magnetic reluctance; and,
   means for selectively generating a second magnetic circuit between said field shell, said rotor disc, and said armature, said second magnetic circuit drawing said armature in a second axial direction towards said rotor disc wherein a second portion of said armature angularly opposite said first portion engages said rotor disc first thereby forcing said first portion to disengage from one of said first and second pole pieces.

2. The clutch/brake unit of claim 1 wherein said rotor disc includes a plurality of radially spaced rows of angularly spaced slots.

3. The clutch/brake unit of claim 1 wherein said armature includes a plurality of radially spaced rows of angularly spaced slots.

4. The clutch/brake unit of claim 1 wherein said armature is connected to said output member by a plurality of leaf springs.

5. The clutch/brake unit of claim 1 wherein said field shell includes a radially outer annular member and said rotor disc includes an annular member disposed radially inwardly of said radially outer annular member.

6. The clutch/brake unit of claim 1 wherein an angular distance spanned by said first and second permanent magnets is less than one half of a circumference of said field shell.

7. The clutch/brake unit of claim 1 wherein a north pole of said first permanent magnet faces said first axial direction and a north pole of said second permanent magnet faces said second axial direction.

8. The clutch/brake unit of claim 1 wherein said third pole piece has a chrome carbide coating.

9. A clutch/brake unit, comprising:
   a rotor disc connected to a shaft for rotation therewith, said shaft extending along a first axis and said rotor disc extending radially outwardly from said shaft, said rotor disc including a first plurality of radially spaced rows of angularly spaced slots;
   an armature axially-spaced from said rotor disc, said armature including a second plurality of radially spaced rows of angularly spaced slots;
   an output member connected to said armature;
   a field shell axially-spaced from said armature by said rotor disc, said field shell including a radially outwardly extending flange;
   first and second pole pieces angularly spaced from one another and connected to said flange, said first and second pole pieces having a relatively low magnetic reluctance;
   first and second permanent magnets disposed between said flange and said first and second pole pieces, respectively, said field shell, said first and second permanent magnets, said first and second pole pieces, and said armature forming a first magnetic circuit drawing said armature in a first axial direction away from said rotor disc and a first portion of said armature into engagement with said first and second pole pieces;

a third pole piece connected to said flange and disposed between said first and second pole pieces, said third pole piece having a relatively high magnetic reluctance; and, means for selectively generating a second magnetic circuit between said field shell, said rotor disc, and said armature, said second magnetic circuit drawing said armature in a second axial direction towards said rotor disc wherein a second portion of said armature angularly opposite said first portion engages said rotor disc first thereby forcing said first portion to disengage from one of said first and second pole pieces.

10. The clutch/brake unit of claim 9 wherein said armature is connected to said output member by a plurality of leaf springs.

11. The clutch/brake unit of claim 9 wherein an angular distance spanned by said first and second permanent magnets is less than one half of a circumference of said field shell.

12. The clutch/brake unit of claim 9 wherein a north pole of said first permanent magnet faces said first axial direction and a north pole of said second permanent magnet faces said second axial direction.

13. The clutch/brake unit of claim 9 wherein said third pole piece has a chrome carbide coating.

14. A clutch/brake unit, comprising:

an input hub connected to a shaft for rotation therewith, said shaft extending along a first axis;

a rotor disc disposed radially outwardly of said input hub and rotatably connected to said input hub;

an armature axially-spaced from said rotor disc;

an output member;

means for connecting said output member to said armature;

a field shell axially-spaced from said armature by said rotor disc, said field shell including a radially outwardly extending flange;

first and second pole pieces angularly spaced from one another and connected to said flange, said first and second pole pieces having a relatively low magnetic reluctance;

first and second permanent magnets disposed between said flange and said first and second pole pieces, respectively, said field shell, said first and second permanent magnets, said first and second pole pieces, and said armature forming a first magnetic circuit drawing said armature in a first axial direction away from said rotor disc and a first portion of said armature into engagement with said first and second pole pieces;

a third pole piece connected to said flange and disposed between said first and second pole pieces, said third pole piece having a relatively high magnetic reluctance; and, means for selectively generating a second magnetic circuit between said field shell, said rotor disc, and said armature, said second magnetic circuit drawing said armature in a second axial direction towards said rotor disc wherein a second portion of said armature angularly opposite said first portion engages said rotor disc first thereby forcing said first portion to disengage from one of said first and second pole pieces.

15. The clutch/brake unit of claim 14 wherein said rotor disc includes a plurality of radially spaced rows of angularly spaced slots.

16. The clutch/brake unit of claim 14 wherein said armature includes a plurality of radially spaced rows of angularly spaced slots.

17. The clutch/brake unit of claim 14 wherein said field shell includes a radially outer annular member and said rotor disc includes an annular member disposed radially inwardly of said radially outer annular member.

18. The clutch/brake unit of claim 14 wherein an angular distance spanned by said first and second permanent magnets is less than one half of a circumference of said field shell.

19. The clutch/brake unit of claim 14 wherein a north pole of said first permanent magnet faces said first axial direction and a north pole of said second permanent magnet faces said second axial direction.

20. The clutch/brake unit of claim 14 wherein said third pole piece has a chrome carbide coating.

* * * * *